Nov. 26, 1929.  F. MUELLER  1,737,056

PISTON RING AND PISTON

Filed Nov. 2, 1928

F. Mueller
Inventor
By C. A. Snow & Co.
Attorneys.

Patented Nov. 26, 1929

1,737,056

UNITED STATES PATENT OFFICE

FRANK MUELLER, OF KANKAKEE, ILLINOIS

PISTON RING AND PISTON

Application filed November 2, 1928. Serial No. 316,791.

This invention relates to a piston ring construction, the ring being especially designed for use in connection with a piston of a particular design.

The primary object of the invention is to provide a piston having a piston ring at each end thereof so that excessive oil flow on the walls of the cylinder in which the piston is moving, will be removed.

Another object of the invention is to provide a piston ring which will hug the wall of the cylinder insuring against loss of compression by the compression passing the ring, during the compression stroke of the piston.

A still further object of the invention is to provide a ring having a substantially V-shaped groove formed in the inner surface thereof, which groove provides a pocket for retaining oil which acts as a cushion for the ring.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
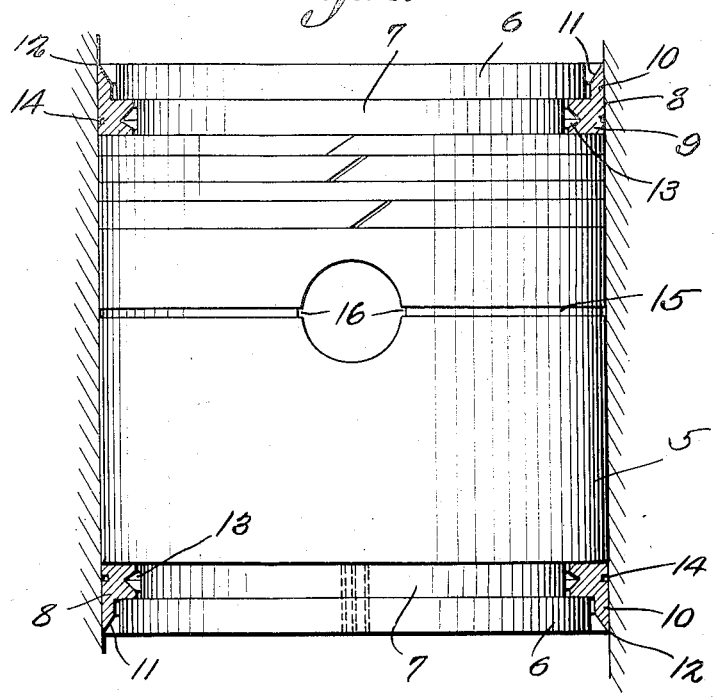
Figure 1 is an elevational view showing a piston equipped with rings constructed in accordance with the invention, the rings being shown in section.
Figure 2:
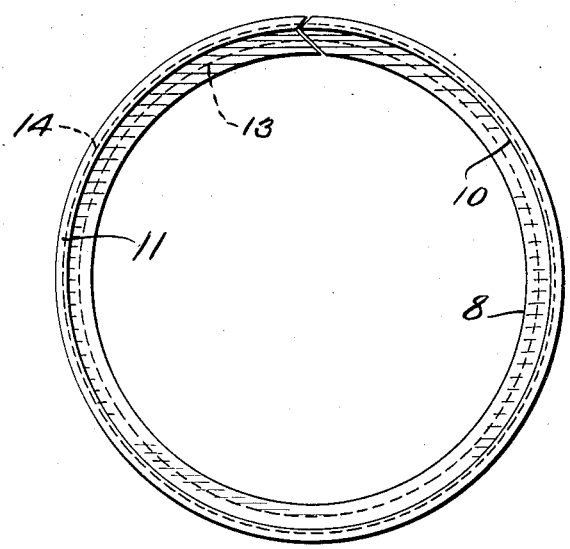
Figure 2 is a plan view of a ring.

Referring to the drawing in detail, the reference character 5 designates a piston, which is of a novel construction, and as shown has reduced end portions 6 which are formed with ring grooves 7 to accommodate the piston rings which are indicated by the reference character 8.

Each of these rings includes a main portion 9 and an upstanding flange 10, the upstanding flange 10 being provided with a conical inner surface 11 defining a knife-like scrapping edge 12. This flange 10 is of a width to lie within the space between the reduced end portion of the piston, and the cylinder wall providing a bearing surface at the ends of the piston.

Formed in the inner surface of the main portion of the ring is a substantially V-shaped groove 13 that defines a pocket for the reception of oil to cushion the movements of the ring.

A groove 15 is formed in the periphery of the piston and communicates with grooves 16 formed in the walls of the wrist pin openings of the piston, so that the oil may pass into the wrist pin openings to lubricate the wrist pin.

From the foregoing it will be obvious that due to this construction a piston equipped with a ring of this character at each end thereof, will have a bearing surface at each end, reducing wear to the minimum and eliminating what is commonly known as piston slap.

An outer groove 14 is provided in the ring and also provides a pocket for the reception of oil.

I claim:

1. A piston ring for use in connection with pistons having reduced end portions, said ring including a main portion and a flange extending from the main portion, said flange having an inclined inner surface defining a scrapping edge, the inner surface of the main portion having a substantially V-shaped groove to catch oil and cushion the movements of the ring, and said ring having a groove formed in the outer surface thereof.

2. A piston ring for use in connection with pistons having reduced ends and having ring grooves, said ring including a main portion, a flange formed integral with the main portion, said flange having an inclined inner surface defining a knife-like scraping edge, said main portion having an inner groove disposed opposite to the base of the ring groove in which the ring is positioned, and said ring having a radial groove formed in the surface thereof.

In testimony that I claim the foregoing as my own, I have hereto affixed my signature.

FRANK MUELLER.